United States Patent [19]

Shirai et al.

[11] Patent Number: 5,278,853
[45] Date of Patent: Jan. 11, 1994

[54] OPTICAL ISOLATOR

[75] Inventors: Kazushi Shirai; Makoto Sumitani; Norio Takeda; Mitsuzo Arii, all of Tokyo, Japan

[73] Assignee: Mitsubishi Gas Chemical Co., Ltd., Tokyo, Japan

[21] Appl. No.: 889,469

[22] Filed: May 27, 1992

[30] Foreign Application Priority Data

May 28, 1991 [JP] Japan .................................. 3-152653

[51] Int. Cl.$^5$ .............................................. H01S 3/00
[52] U.S. Cl. .................................... 372/37; 372/703
[58] Field of Search .................................... 372/703, 37

[56] References Cited

U.S. PATENT DOCUMENTS

| 4,178,073 | 12/1979 | Uchida | 350/151 |
| 4,698,820 | 10/1987 | Brandle, Jr. et al. | 372/41 |
| 5,044,713 | 9/1991 | Mozer et al. | 372/703 |

FOREIGN PATENT DOCUMENTS

| 0352002 | 1/1990 | European Pat. Off. | G02F 1/09 |
| 58-28561 | 6/1983 | Japan . | |
| 60-49297 | 11/1985 | Japan . | |
| 60-51690 | 11/1985 | Japan . | |
| 61-58809 | 12/1986 | Japan . | |
| 0364968 | 4/1990 | Japan | 372/703 |
| 0272419 | 11/1990 | Japan | 372/703 |
| 0135512 | 6/1991 | Japan | 372/703 |
| 0135515 | 6/1991 | Japan | 372/703 |

OTHER PUBLICATIONS

Optics Letters, vol. 15, No. 8, Apr. 15, 1990, New York US pp. 449-451; Chang K. W. et al: High-performance single-mode fiber polarization-independent isolators.
Patent Abstracts of Japan, vol. 4, No. 51 (P-007) Apr. 17, 1980 & JP-A-55 022 729 (NTT) Feb. 18, 1980 *abstract* & JP-B-58 028 561 (NTT).
Patent Abstracts of Japan, vol. 6, No. 188 (p-144) Sep. 28, 1982 & JP-A-57 100 410 (Fujitsu Ltd) Jun. 22, 1982 *abstract* & JP-B-61 058 809 (Fujitsu Ltd).

*Primary Examiner*—Léon Scott, Jr.
*Attorney, Agent, or Firm*—Sughrue, Mion, Zinn, Macpeak & Seas

[57] ABSTRACT

A high quality small-sized polarization independent optical isolator for use in an optical fiber communication system, wherein a pair of magneto-optical elements having Faraday rotation angle of 45±5 are contained in permanent magnets and arranged between a pair of birefringent crystal plates for splitting and combining an optical path of a laser light, and two polarizers arranged in parallel as being bounded on the midpoint of separated optical paths are interposed between the pair of magneto-optical elements, whereby a degree of worsening the optical isolation can be kept minimum against variations of an environmental temperature and wave length.

4 Claims, 5 Drawing Sheets

OPTICAL ISOLATOR

BACKGROUND OF THE INVENTION

1. Field of the Invention

This invention relates to an optical isolator independent of a direction of polarization and, more particularly, a polarization independent optical isolator which is independent of the direction of polarization and very easy to carry out assemblage and alignment.

2. Description of the Prior Art

A semiconductor laser is very common as a coherent light source for an applied optical instrument, light communication equipment or the like. However, the semiconductor laser has a serious problem or disadvantage such that, when a coherent light transmitted from the semiconductor laser is directed to an optical system, such as to one end surface of a connector, the coherent light reflected back to the semiconductor laser light source causes the laser oscillation to become unstable.

To eliminate the problems encountered by the semiconductor laser, an optical isolator has been provided at an output-side of the semiconductor laser (in this specification, it is assumed that the output-side of the laser source is always located at the left side of drawings), and a reflected laser light has been prevented from returning back to the semiconductor laser light source by designing and arranging forward and reverse optical paths properly within the optical isolator.

The optical isolator of the prior art is provided by an optical system including a magneto-optical element for separating a reflected laser light (shown by a light beam "b" propagating from right to left in the drawings) from a laser light in forward direction transmitted by the semiconductor laser light source (shown by a light beam "a" propagating from left to right) based on the Faraday rotation effect.

Generally, the optical isolator of the prior art includes a magneto-optical element 3 (a Faraday rotation element) arranged at the inside of a permanent magnet 4 which is placed between a polarizer 1 and an analyzer 2, as shown in FIG. 1, for intercepting the reflected laser light or returning laser light coming back to the semiconductor laser light source.

More specifically, in FIG. 1, the laser light "a" transmitted, in forward direction, from the semiconductor laser light source passes through the magneto-optical element 3 after being converted, at the polarizer 1, into a linearly polarized laser light having a plane of oscillation in a vertical direction. A polarization plane of the incident laser light to the magneto-optical element 3 is rotated clockwise by an amount of 45 degrees when it is viewed from the side of the semiconductor laser light source, whereas the direction of rotation of the polarization plane may depend on a direction of magnetic force of the permanent magnet and/or a material of the magneto-optical element.

For simplifying and clarifying the description, it is assumed for the direction of polarization rotation that, when it is viewed from the side of the semiconductor laser light source, a right-handed rotation is always designated by a clockwise rotation while a left-handed rotation is designated by a counter-clockwise rotation unless otherwise specified hereinafter.

The analyzer 2 is arranged in perpendicular to a plane of polarization the polarized wave cut-off direction of which is rotated clockwise by 45 degrees. Accordingly, a polarized component of the ordinary light "a" having a polarization plane in a vertical direction being transmitted from the semiconductor laser light source can transmit through all the optical elements, such as the polarizer 1, magneto-optical element 3 and analyzer 2, without any loss except a little absorption and Fresnel reflection.

On the other hand, the laser light "b" in reverse direction, or the reflected laser light (reflected returning light) in return to the semiconductor laser light source, enters the magneto-optical element 3 after passing through the analyzer 2. A polarization plane of the reflected laser light "b" in reverse direction incident to the magneto-optical element 3 is in turn rotated by 45 degrees in the same manner as in the rotation of the laser light "a" in forward direction.

Since the rotation of the polarization plane of the reflected laser light "b" in reverse direction is also performed toward the same direction as that of the laser light "a" in forward direction regardless of the direction of propagation due to a specific feature of the magneto-optical element or the non-reciprocal effect, the polarization plane of the laser light "b" is again rotated clockwise by 45 degrees at the magneto-optical element 3. Therefore, the polarization direction of the reflected laser light "b" in reverse direction after passing through the magneto-optical element 3 has an angle of 90 degrees in total to the polarization direction of the laser light "a" in forward direction.

In this manner, the reflected laser light "b" in reverse direction that has passed through the magneto-optical element 3, or the reflected light (reflected returning light) to the semiconductor laser light source, is unable to pass through the polarizer 1 and is prevented by the polarizer 1 from returning to the semiconductor laser light source.

An optical isolator fundamentally has a function of allowing to pass through an incident light from the side of semiconductor laser light source (left side), for example, an output laser light, while intercepting an incident light from the counter side (right side), for example, a reflected laser light in reverse direction.

The foregoing description as to the function of the optical isolator is directed to the one employing a dichroic polarizer in both the polarizer 1 and analyzer 2, for example, the dichroic polarizer produced by Corning Glass Inc. and known under the trade name of "Polarcor", however, it is also possible to attain substantially the same function as that of the above by employing a birefringent crystal plate such as of rutile single crystal for both the polarizer and analyzer. The difference between these two types of optical isolators may be found in such that the reflected laser light "b" is intercepted at the polarizer 1 in case of the dichroic polarizer, as described hereinabove.

On the contrary, in case of the birefringent crystal plate, the reflected laser light "b" is prevented from returning back to an emitting point of the semiconductor laser light source by altering an optical path of the reflected laser light "b" diagonally within the birefringent crystal plate, wherein the optical path or optical axis of the reflected laser light "b" is shifted from that of the laser light "a" for being emitted from the birefringent crystal plate toward a point where is completely different from the optical path of the laser light "a" in forward direction.

The emitted semiconductor laser light is substantially a linearly polarized light, so that the optical isolator can transmit the laser light therethrough, substantially with no loss, by aligning a direction of polarization of the laser light with the polarized light transmissible direction of the polarizer. However, if the optical isolator shown in FIG. 1 were inserted between optical fibers wherein substantially non-polarized light rays are propagating, all the light rays, polarization planes of which are not identical to the direction of polarization of the polarizer, will be impeded and blocked by the polarizer 1.

In general, an amount of light loss at the polarizer causing from the blockage or isolation may reach to an order of 3 dB. Several optical isolators have been proposed in the past for eliminating the light loss encountered by the insertion of the optical isolators and some of them are disclosed in Japanese Patent Publications.

In Japanese Patent Publications No. 60-51690 and No. 58-28561, three birefringent crystal plates are assembled to provide the optical isolator, while in a Japanese Patent Publication No. 60-49297, two birefringent crystal plates are combined with an optically active element, and further in a Japanese Patent Publication No. 61-58809, tapered birefringent crystal plates and lenses are employed.

According to the optical isolators disclosed in the Japanese Patent Publications above, the light having omnidirectional polarization is split up once into two orthogonal polarized wave components by means of a birefringent crystal plate, however, since these orthogonal polarized wave components are combined again by means of another birefringent crystal plate and/or a lens, the both polarized wave components can be transmitted through the optical isolator without losing any.

On the contrary, the reflected light in reverse direction is, owing to the non-reciprocity of the magneto-optical element, guided out of the magneto-optical element from a point other than a point at where the light in forward direction has entered, thus the reflected light in reverse direction never returns back to the semiconductor laser light source or semiconductor laser light emitting point.

Further, a polarization independent optical isolator has also been proposed in a Japanese Patent Publication No. 60-51690, a configuration of which is shown in FIGS. 2 and 4. FIG. 2 is a side view of the polarization independent optical isolator showing optical paths of the laser light "a" propagating therethrough, while FIG. 4 is a side view of the polarization independent optical isolator showing optical paths of the reflected laser light "b" propagating in reverse direction through the optical isolator.

In FIGS. 2 and 4, element 5 designates a first birefringent crystal plate provided by cutting an uniaxial crystal, such as a rutile single crystal and the like, into a plate with parallel surfaces in such a manner as an optical axis of the uniaxial crystal being inclined against the parallel surfaces, and element 6 designates a magneto-optical element made of, for example, a bismuth substituted iron garnet single crystal having a Faraday rotation angle of 45 degrees.

Further, element 7 designates a second birefringent crystal plate an optical axis of which is inclined by the same amount as that of the first birefringent crystal plate 5 against the surfaces thereof but rotated clockwise by an amount of 45 degrees from the first birefringent crystal plate 5 about the incident laser light "a" as an axis, element 8 designates a third birefringent plate an optical axis of which is inclined by the same amount as that of the first birefringent crystal plate 5 against the surfaces thereof but rotated counter-clockwise by an amount of 45 degrees from the first birefringent crystal plate 5 about the incident laser light "a" as an axis, and element 9 designates a permanent magnet to saturate the magneto-optical element 6 magnetically.

Positions of light exit and directions of polarization at surfaces of the first birefringent crystal plate 5, magneto-optical element 6, the second birefringent crystal plate and third birefringent crystal plate 8 are illustrated in FIG. 3 and that directions of optical axis of the birefringent crystal plates 5, 7 and 8 are also illustrated in the same Figure.

The operation of the optical isolator shown in FIGS. 2 and 4 will now be described in more detail. As shown in FIG. 2, the incident laser light "a" in forward direction is split into two laser beams having orthogonal oscillation planes, or an ordinary light and extraordinary light, by means of the first birefringent plate 5. The ordinary light proceeds directly through the first birefringent crystal plate 5 while the extraordinary light proceeds diagonally through the same birefringent crystal plate 5.

The ordinary light and extraordinary light then enter the magneto-optical element 6 after passing through the first birefringent crystal plate 5 and propagating along parallel optical paths, each polarization plane of which is in turn rotated clockwise by 45 degrees at the magneto-optical element 6. The ordinary light and extraordinary light then enter into the second birefringent crystal plate 7 after passing through the magneto-optical element 6.

The second birefringent crystal plate 7 is so arranged that an optical axis of which is inclined by an amount of 45 degrees against the optical axis of the first birefringent crystal 5. Accordingly, only the polarized component of the incident laser light to the second birefringent crystal plate 7 in parallel with the optical axis thereof proceeds diagonally within the second birefringent crystal plate 7. The laser light passed through the second birefringent crystal plate 7 then enter into the third birefringent crystal plate 8. The third birefringent crystal plate 8 is so arranged that its optical axis inclines 90 degrees against the optical axis of the second birefringent crystal 7. Accordingly, the polarized component of the incident laser light in parallel with the optical axis of the third birefringent crystal plate 8 proceeds diagonally therethrough.

By selecting the thickness of the second birefringent crystal plate 7 and third birefringent crystal plate 8 to become one by square root $(1/\sqrt{2})$ of the thickness of the first birefringent crystal plate 5, it is possible to combine the two laser light beams separated at the first birefringent crystal plate 5 into one laser light beam at the third birefringent crystal plate 8.

On the other hand, the reflected laser light "b" in reverse direction returns back to the magneto-optical element 6 by passing through the third birefringent crystal plate 8 and second birefringent crystal plate 7, as shown in FIG. 4, on the track of the same optical path as that of the laser light "a" in forward direction. A direction of polarization of the reflected laser light "b" in reverse direction that has passed through the magneto-optical element 6 is orthogonal to the direction of polarization of the laser light "a" in forward direction as it has rotated clockwise by the amount of 45 degrees at the magneto-optical element 6.

Consequently, the reflected laser light "b" in reverse direction will be led out of the first birefringent crystal plate 5 at a point other than the point of incidence of the laser light "a" in forward direction upon passing through the first birefringent crystal plate 5.

In accordance with the polarization independent optical isolator, as described above, the non-polarized laser light designated by "a" propagating from the left side or the side where the semiconductor laser light source is located (laser light emitter side) and the non-polarized laser light "b" propagating from the right side or the other side of the optical isolator can be isolated completely.

Another system has been proposed by Matsumoto in a Japanese Patent Publication No. 58-28561, wherein lenses 10 and 11 are provided at the both outer limits of the first birefringent crystal plate 5 and the third birefringent crystal plate 8, as shown in FIG. 5, for converging the laser light within the optical isolator. In accordance with this configuration, a distance for separating the two polarized laser components within the optical isolator can be shortened and the thickness of the birefringent crystal plates can be decreased. As seen in the optical isolator of FIG. 5, optical paths of the laser light "a" in forward direction and laser light "b" in reverse direction are the same as that of FIGS. 2 and 4.

Another type of optical isolator has been proposed by Uchida in a Japanese Patent Publication No. 60-49297, wherein birefringent crystal plates and an optically active element are employed as shown in FIG. 6. This type of optical isolator is provided by substituting an optically active element 13 for the second birefringent crystal plate 7 of the polarization independent optical isolator of FIG. 4.

In accordance with this optical isolator of FIG. 6, the polarization plane of the laser light in forward direction incident from the left side of the birefringent crystal plate 5 is rotated clockwise by 45 degrees at the magneto-optical element 6, however, the polarization plane of the laser light is once again rotated counter-clockwise by 45 degrees at the optically active element 13. Thus, the incident laser light to the birefringent crystal element 12 has the same polarization plane as that of the laser light passed through the birefringent crystal plate 5 or the incident laser light to the magneto-optical element 6. In this way, the ordinary light and extraordinary light which have been split into two beams at the birefringent crystal plate 5 are recombined by means of the birefringent crystal plate 12.

In contrast with the above, in case of the reflected laser light in reverse direction or the light propagating from the right side of the birefringent crystal plate 12 of the optical isolator to the left, the plane of polarization is rotated clockwise by 45 degrees when passing through the optically active element 13. The rotated polarization plane of the reflected laser light is again rotated clockwise by 45 degrees when passing through the magneto-optical element 6.

Accordingly, the polarization plane of the reflected laser light in reverse direction that has passed through the magneto-optical element 6 has a difference of 90 degrees with the polarization direction of the laser light in forward direction. Therefore, the reflected laser light in reverse direction entered into the birefringent crystal plate 5 will come out therefrom at a point other than the incident point of the laser light in forward direction, thus the reflected laser light in reverse direction is prevented from returning back to the point of emitting laser light or the semiconductor laser light source.

In addition to the above, still another type of optical isolator has been proposed by Shirasaki in a Japanese Patent Publication No. 61-58809, wherein tapered birefringent crystal plates are employed (as shown in FIG. 8). This type of optical isolator employs tapered birefringent crystal plates 14 and 15 as the birefringent crystal plates.

In accordance with the optical isolator of FIG. 8, the laser light "a" propagating in forward direction enters into the second tapered birefringent crystal plate 15, transmits therethrough as being separated in parallel and enters into a lens 11 for being focused onto an optical fiber 17 at the receiving side.

On the contrary, as shown in FIG. 8, the reflected laser light "b" in reverse direction enters into the first birefringent crystal plate 14 after passing through the magneto-optical element 6. The optical path of the reflected light "b" is then diverged by the act of the first birefringent crystal plate 14, thus the reflected laser light "b" never reaches to the optical fiber 16 at the transmitter side.

Recently, an optical fiber communication attracts attention in a communication area as a high speed and large capacity communication system. In the light of a tendency of the above, many researches and developments have been made in the past for materializing the optical fiber communication, putting the optical fiber communication into a practical use and obtaining a higher speed in the optical fiber communication. Accordingly, there have been proposed various types of optical isolators such as described herein above which constitute one of the main parts of a transmitter and receiver in the optical fiber communication system.

However, all the proposed polarization independent optical isolators employ the Faraday rotation effect of the magneto-optical element, therefore, a misalignment of an optical system and errors, such as a deviation from the Faraday rotation angle of 45 degrees, to be encountered in a process of producing the an optical element or assembling an optical device have resulted in serious problems heretofore.

More specifically, a bismuth substituted iron garnet single crystal produced by a liquid phase epitaxial method is normally employed as the magneto-optical element for the optical isolators. The bismuth substituted iron garnet single crystal grown on a non-magnetic garnet substrate to a thickness of several hundred microns through the liquid phase epitaxial method is ground precisely to the thickness with which the Faraday rotation angle of 45 degrees can be attained.

The bismuth substituted iron garnet single crystal usable for the magneto-optical element of the optical isolator is selected from a number of pellets obtained by grinding the bismuth substituted iron garnet single crystal based on an allowable thickness tolerance. The thickness of the pellets of the bismuth substituted iron garnet single crystal selected for the magneto-optical element has variations of several microns. Since the thickness variations of the bismuth substituted iron garnet single crystal are caused solely from an accuracy of grinding operation, it is impossible to eliminate the thickness variations completely in accordance with the present grinding technical level. Accordingly, heretofore, the quality and optical accuracy of the bismuth substituted iron garnet for use in the optical isolator as the magneto-optical element can only be maintained by the selecting method as described above, whereas the quality of the bismuth substituted iron garnet can be improved by decreasing the tolerances while the yield rate of the products is lowered, and it becomes unprofitable.

Further, it is known that an amount of a solid solution of bismuth in the bismuth substituted iron garnet single crystal provided by the liquid phase epitaxial method may vary in response to a slight change in a condition of growth of the single crystal, and a Faraday rotation angle per unit of thickness of the grown-up single crystal may vary in response to the amount of the solid solution of bismuth in the single crystal. The quality, or the tolerance of the Faraday rotation angle, of the bismuth substituted iron garnet single crystal, presently available on the market, for use as a magneto-optical is normally 1-2%.

Accordingly, the magneto-optical element obtained by grinding the bismuth substituted iron garnet single crystal produced by the liquid phase epitaxial method has an error of 0.5-1.0% in the Faraday rotation angle.

As described above, the bismuth substituted iron garnet single crystal to be utilized as the magneto-optical element normally has such error in the Faraday rotation angle as to be equivalent, at least, to the tolerance of the selection. Therefore, to attain a high isolation as an optical isolator, it is necessary to adjust or compensate a direction of the optical axis of the first birefringent plate by an amount which is commensurate with an angle of deviation ($\Delta\theta$) from the reference angle of 45 degrees.

If it is assumed that the deviation angle $\Delta\theta$ is one degree ($\Delta\theta = 1°$) from the reference angle, a extinction ratio of the first birefringent plate will be 35 dB (the theoretical maximum extinction ratio) in accordance with an equation of $-10 \cdot \log[\sin^2(\Delta\theta)]$. Practically, the isolation required for the optical isolator is at or above 30 dB. Therefore, if the deviation angle of $\Delta\theta$ from the reference angle is one degree, a required performance can be satisfied theoretically, and no adjustment as well as compensation will be required for the birefringent crystal plate along the optical axis thereof.

However, in the actual state, the deviation angle of $\Delta\theta$ from the reference angle will be expanded from the theoretical value of one degree owing to the temperature dependence and light wave length dependence of the Faraday rotation angle of the magneto-optical element and further to a difference between a wave length of laser light used in the process of assembling and a wave length of laser light in the actual use, which difference is normally several nm, thus resulting in the difficulty to maintain the utmost of 30 dB.

As to an optical isolator, for example, having the deviation angle $\Delta\theta$ of one degree assembled by employing $Ho_{1.1}Tb_{0.6}Bi_{1.3}Fe_5O_{12}$ available on the market, if an environmental temperature varies more than 12° C. or the wave length of the laser light in use differs by 6 nm or more from that of the laser light utilized in the process of assembling, the deviation angle $\Delta\theta$ from the reference angle will become 1.8 degrees or more, thus decreasing the isolation to less than 30 dB and losing practicality.

To ensure the practical performance and quality of the optical isolator, it is necessary for optical isolation to maintain at least 40 dB or more during the process of assembling. However, it is practically impossible to maintain such high optical isolation only by improving the quality of the magneto-optical element and all that it is economically disadvantageous. The adjustment and compensation along the optical axis of the first birefringent crystal plate are prerequisite as the second best plan to improve the optical isolation, and further they have the importance as the fundamental technique in the industrial practice.

An outline of the adjustment and compensation along the optical axis of the first birefringent crystal plate will now be described by referring to FIG. 7.

FIG. 7 is a diagram showing an optical isolator for illustrating the adjustment and compensation along the optical axis of the optical isolator, for example, by referring to the optical isolator shown in FIGS. 2 and 4. The operation of adjustment and compensation of the optical isolator is provided by:

1) mounting lenses 10 and 11 and optical fibers 16 and 17 at the both ends of the optical isolator;

2) transmitting the laser light from the optical fiber 16 at the left side or the side of semiconductor laser light source and confirming the correct reception of the laser light by the optical fiber 17 at the right side or the receiving side;

3) transmitting the laser light in a reverse direction from the optical fiber 17 at the right side and rotating the first birefringent crystal plate 5 to minimize the strength of the laser light "b'" (shown by a dot line in FIG. 7) reaching to the optical fiber 16 at the left side.

In general, a core diameter of the optical fiber is so small such as of 5-10 μm. Accordingly, the operation for adjustment and compensation along the optical axis of the optical isolator is implemented precisely with extreme care. However, an optical path or optical axis of the optical system is displace easily by the adjustment of the first birefringent crystal plate 5, whereas if the axis of optical path of the optical system is displaced, the laser light "b'" can never be received by the optical fiber 16.

Normally, the adjustment, compensation and control of the optical axis of the first birefringent crystal plate 5 and that of the axis of optical path of the optical system are implemented by tracing the laser light "b'" with the optical fiber 16 coupled to a power meter. However, in an actual operation, it is often hard for the operator to discriminate, or decide, whether or not a state of vanishment is resulted from the proper alignment of the optical path of the birefringent crystal plate, since the same vanishment may happen when no laser light reaches to the optical fiber due to the misalignment of the axis of optical path of the optical system. Under the present technical level, the optical adjustment of the birefringent crystal plate 5 has to be implemented by moving the optical fibers 16 precisely with use of a precision locating device as tracing scrupulously, with extreme care, the incident laser light "b'" to the optical fiber 16. Hence, it is still difficult to mechanize and adopt a mass production system. The drawback as described above has been one of the main reasons for delaying the versatility of the polarization independent optical isolator.

For making easier the adjustment and compensation of the optical axis of the first birefringent crystal plate and that of the axis of optical path of the optical system, a separation between the laser light "b" and the laser light "b'" may be increased. In accordance with the method as stated above, it is possible to accept or receive the laser light "b" by making use of a photodetector which is available on the market, if the separation between the laser light "b" and the laser light "b'" is selected to be several millimeters. Consequently, the operation of adjustment and compensation of the optical axis of the first birefringent crystal plate and that of the axis of optical path of the optical system become very easy.

However, in order to provide, for example, a separation of several millimeters (mm) between the light "b" and light "b'", it is required to select the thickness of the birefringent crystal plate 5 to be several centimeters or more and also to thicken other birefringent crystal plates, such as the birefringent crystal plate 7 and birefringent crystal plate 8 as well. Normally, the birefringent crystal plates are made of expensive rutile single crystal. Therefore, the method of increasing the separation between the laser light "b" and laser light "b'" lacks rationality and inevitability in the light of economical and technical point of view. Thus, it is no exaggeration to say that the method described above lacks practicality as an industrial technology.

The operation of adjustment and compensation of the optical axis of the first birefringent crystal plate and that of the axis of optical path of the optical system has been described hereinbefore by referring to FIGS. 2 and 4, however, optical isolators shown in FIGS. 5 and 6 also have the similar problems.

Now referring to FIG. 8, there is shown an optical isolator having tapered birefringent crystal plates 14 and 15, wherein a separation angle of the laser light "a" and laser light "b" can be widened by increasing taper angles of the tapered birefringent crystal plates 14 and 15. Consequently, the operation of adjustment and compensation of the optical axis of the first birefringent crystal plate and that of the axis of optical path of the optical system become somewhat easier as compared with the other prior-art methods. However, if the taper angles are widened, there is provided a large-sized optical isolator owing to the fact that a distance between the lens 11, which is for converging the light transmitted through the tapered birefringent crystal plate 15 into the optical fiber 17, and the optical fiber 17 is elongated since the separation between the light beams in the forward direction becomes large, and there cause problems such as increasing an optical coupling loss and the like.

As described above, in accordance with the prior-art polarization independent optical isolator, since a laser light beam or laser light emitted from the semiconductor laser light source is reflected at surfaces of the optical system, there is a reflected return laser light to the semiconductor laser light source. The laser oscillation at the semiconductor laser light source becomes unstable if the reflected return laser light reenters therein. Accordingly, in order to make the optical isolator practical in use, it has been inevitable to implement an angular adjustment of the birefringent crystal plate, or the operation of the optical adjustment and compensation in a direction along the optical axis. As it has been described hereinbefore, the operation of the optical adjustment and compensation of the optical isolator along the optical axis is extremely difficult. Therefore, one of the most important theme in the field of optical fiber communication is to provide an optical isolator which only requires easy or no optical adjustment and compensation for popularizing the semiconductor laser and, more particularly, the optical fiber communication system To eliminate such difficulties as described above, a polarization independent optical isolator, shown in FIG. 9, has been proposed by Shiraishi and Kawakami, Research Institute of Electrical Communication, Tohoku University (Trans. IECE Japan, Spring 1991, C-290).

In FIG. 9, elements 18 and 19 are birefringent crystal plates, elements 20 and 21 are half-wave plates, and elements 22 and 23 are polarization dependent optical isolators. An incident laser light "a" is split into crossed laser beams or an ordinary light "c" and extraordinary light "d" at the first birefringent crystal plate 18, whereas an optical path for the ordinary light "c" is indicated by the same character "c" and that of the extraordinary light "d" by the same character "d". A polarization plane of the extraordinary light "d" is rotated by 90 degrees through the half-wave plate 20 inserted in the optical path thereof to coincide with the polarization plane of the ordinary light "c". The extraordinary light "d" then enters the polarization dependent optical isolators 22 and 23 together with the ordinary light "c". Since the incident extraordinary light "d" has the same polarization plane as that of the ordinary light "c", the extraordinary light "d" is able to pass through the polarization dependent optical isolators 22 and 23 both of which are arranged in alignment with the polarization direction of the ordinary light "c". The polarization planes of the ordinary light "c" and extraordinary light "d" are rotated by 90 degrees when passing through the polarization dependent optical isolators 22 and 23, hence each of the light "c" and light "d" becomes the extraordinary light. The light "c" is in turn rotated by 90 degrees again by means of another half wave plate 21 inserted in the optical path of the light "c". Accordingly, the ordinary light "c" and extraordinary light "d" are then recombined by the second birefringent crystal plate 19.

On the other hand, the reflected laser light "b" in reverse direction is not in a position to pass through the polarization dependent optical isolators 22 and 23. Therefore, an adjustment of the polarizer to compensate an optical misalignment caused by an angular deviation of the Faraday rotator can be implemented satisfactorily only by aligning the polarization dependent optical isolators beforehand. Accordingly, the assembling and adjusting of this type of optical isolator are comparatively easier than that of the firstly mentioned conventional prior-art optical isolators. However, this optical isolator requires two birefringent crystal plates, two half-wave plates and two polarization dependent optical isolators, each of which is made up of two polarizers, one Faraday element and one permanent magnet. It is apparent that this optical isolator has drawbacks in economical respects because the composing elements of which are too many as compared with the conventional polarization independent optical isolator.

As described above, it has been inevitable for the prior-art polarization independent optical isolators to perform precise and fine adjustments and compensation along the optical axis of the optical isolator for eliminating any defects resulting from angular errors in Faraday rotation angle. Further, another prior-art polarization independent optical isolator requires too many composing elements, such as two sets of polarization dependent optical isolators, thus having economical disadvantages.

SUMMARY OF THE INVENTION

It is therefore an object of this invention to eliminate drawbacks encountered by the prior-art polarization independent optical isolators and to provide a polarization independent optical isolator, which is easy of assembling, easy of adjustment, less numbers of composing elements while having features that contribute to greater accuracy, lower optical loss, higher quality, smaller size and larger quantity at low price from the viewpoint of manufacturing industry, for popularizing a semiconductor laser communication, more specifically an optical fiber communication.

The optical isolator according to this invention comprises two magneto-optical elements, each of which has a substantial rotation angle of 45 degrees and contained in a permanent magnet, arranged between two birefringent crystal plates, polarization planes of which are perpendicular to each other, for splitting and combining an optical path of the laser light that passes therethrough, and two polarizers positioned between the magneto-optical elements and arranged in parallel about the center of the separation of optical paths of the birefringent crystal plates as a boundary.

In accordance with this invention, an optical performance generally required for an optical isolator is fulfilled even if the isolator is assembled without making any adjustment. Accordingly, the high precision and difficult adjustment which has been required in the prior art can be eliminated.

Although, in accordance with this invention, no alignment along a direction of the optical axis of the birefringent crystal plate is necessary in essential. When an extremely high performance is required, it can be obtained by implementing a simple and easy adjustment and tuning of the polarizers along the optical axis thereof, thus decreasing considerably a productive costs of optical isolator even if the adjustment and compensation were implemented. By implementing the simple and easy adjustment of the polarizers along the direction of the optical path, the reflected laser light in reverse direction is cut-off completely by the polarizers.

In the optical isolator of the present invention, an amount of the reflected light in reverse direction that passes through the polarizers can easily measured, directly, by utilizing a photo detector which is available on the market. Accordingly, the optical adjustment or the manipulation therefor along the direction of the optical path of the polarizers can be performed simply by utilizing a commercially available photo-detector without depending on intuition or experiences like in the prior art optical isolators.

Further, in embodying the present invention, no specific birefringent crystal plates are required, whereas any appropriate birefringent crystal plates can be selected on the market, for example, calcite, rutile single crystal and the like are suitable for the birefringent crystal plates of the present invention on account of easiness in obtaining. Moreover, the polarizers to be arranged between the magneto-optical elements are also not necessary be special ones but conventional polarizers can be selected on the market and, for example, a dichroic polarizer is very much suited on account of performance. Further, it is preferable to select the quality of the Faraday rotator or the Faraday rotation angle within a range of 45°±5°, more preferably, 45°±3°. If a deviation of the Faraday rotation angle of the Faraday rotator exceeds 5 degrees, it is not worthwhile as an insertion loss against the laser light in forward direction becomes considerable.

Still further, in accordance with the optical isolator of this invention, owing to its configuration, a degree of worsening the isolation can be kept minimum against an environmental temperature variation and a change of wave length. It is no exaggeration to say that the aforesaid advantages of this invention result in a great improvement in the field of optical isolator, and the optical isolator embodying the present invention may contribute to the popularization and diffusion of the semiconductor laser and, more particularly, the optical fiber communication.

The fundamental configuration of the optical isolator in accordance with this invention is a polarization independent optical isolator as described hereinbefore, however, it is apparent for those skilled in the art that the present invention can also be utilized as a polarization dependent optical isolator.

DETAILED DESCRIPTION OF THE PREFERRED EMBODIMENTS

Figure 1A:
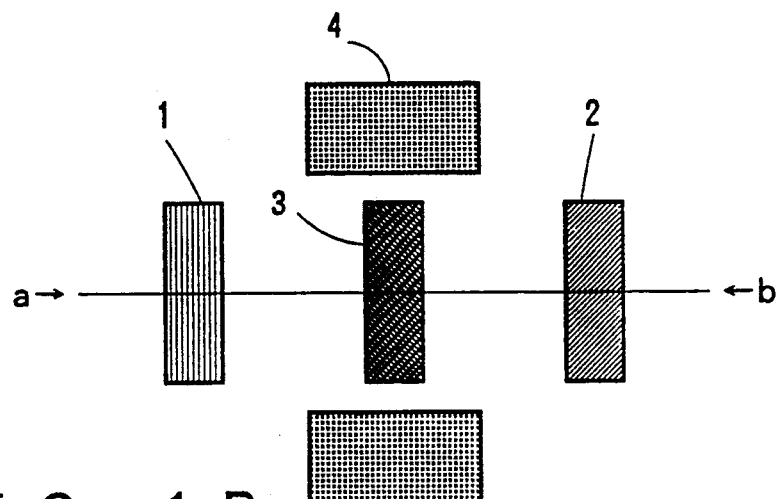
FIG. 1A is a diagram showing an optical isolator of prior art for isolating a reflected laser light to a semiconductor laser light source.
Figure 1B:
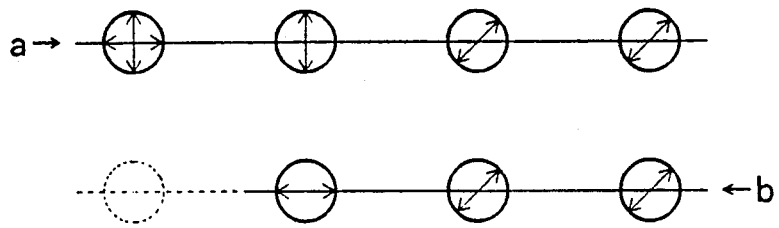
FIG. 1B is a diagram illustrating changes of polarization directions along optical paths.
Figure 2:
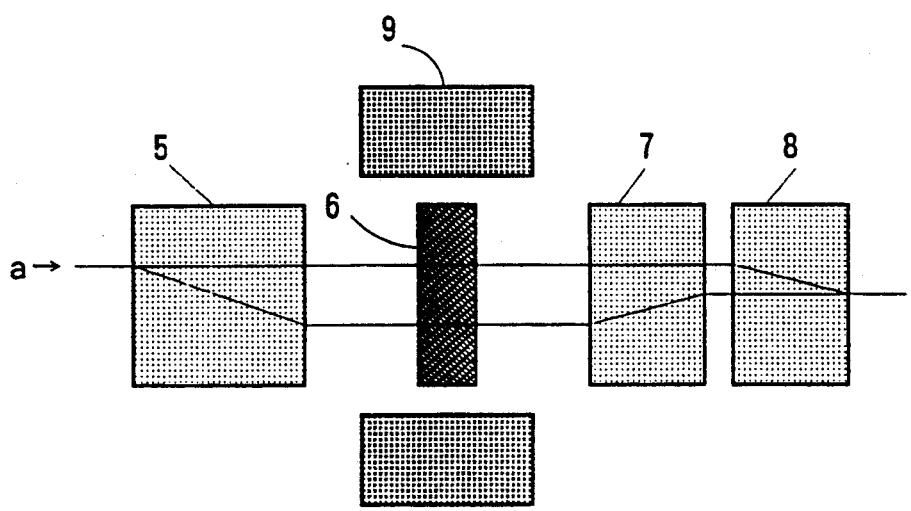
FIG. 2 is a diagram showing a prior-art polarization independent optical isolator with optical paths in forward direction.
Figure 3:
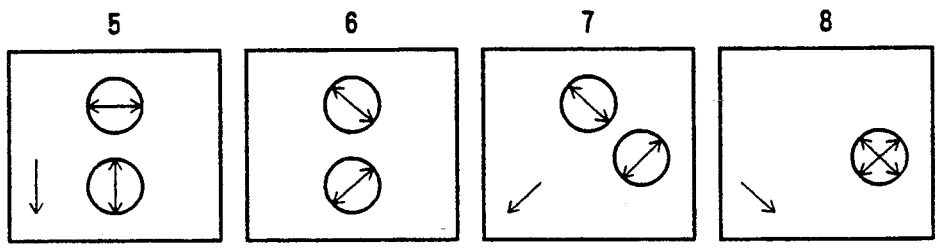
FIG. 3 is a diagram illustrating polarization directions and optical paths of FIG. 2.
Figure 4:
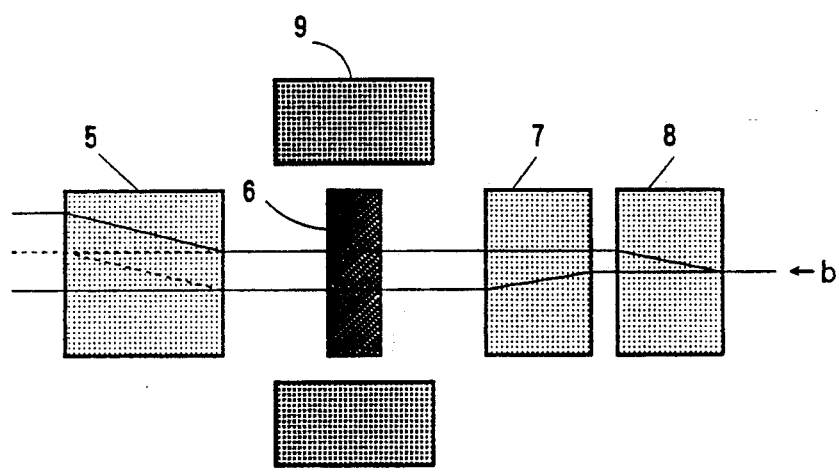
FIG. 4 is a diagram showing optical paths in reverse direction of the polarization independent optical isolator of FIG. 2.

A configuration of an optical isolator embodying the present invention is shown schematically in FIG. 10.

In FIG. 10, elements 24 and 25 designate birefringent crystal plates, elements 26 and 27 designate polarizers, elements 28 and 29 designate magneto-optical elements, and elements 30 and 31 designate permanent magnets.

The laser light "a" emitted by the semiconductor laser light source enters into the first birefringent crystal plate 24 and passes therethrough, and is split into two laser light beams, oscillation planes of which are orthogonal to each other. The two laser light beams passed through the first birefringent crystal plate 24 propagate parallel to each other and enter into the first magneto-optical element 28. A polarization plane of each laser light beam incident on the first magneto-optical element 28 is rotated anti-clockwise by the magneto-optical element 28 by an amount of 45 degrees. Each laser light beam passed through the first magneto-optical element 28 propagates, respectively, through the polarizers 26 and 27, polarization planes of which are aligned to coincide respectively therewith, and enters into the second magneto-optical element 29. Each laser light beam incident on the second magneto-optical element 29 is rotated clockwise with its polarization plane by an amount of 45 degrees and propagates therethrough. The laser light beams passed through the second magneto-optical element 29 then enter the second birefringent crystal plate 25, and optical, paths of them are recombined at the birefringent crystal plate 25.

Figure 10A:
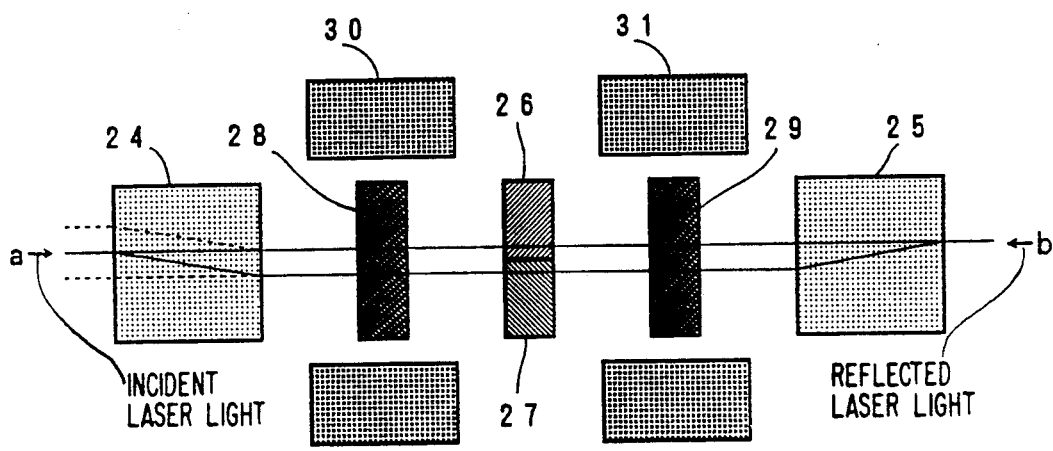
FIG. 10A is a diagram showing a polarization independent optical isolator embodying the present invention for illustrating the principle thereof.
Figure 10B:
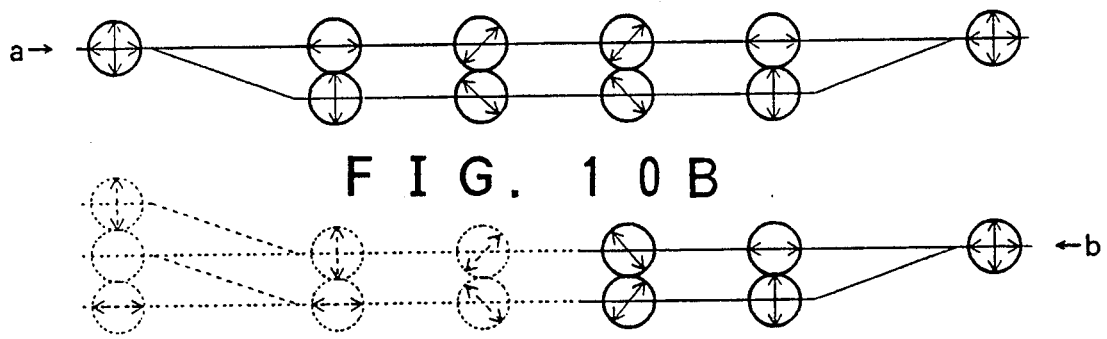
FIG. 10B is a diagram illustrating changes of optical paths and polarization directions along the optical paths.

In FIGS. 10A and 10B, directions of magnetization of permanent magnets 30 and 31 are opposite to each other, however, if the direction of magnetization of the permanent magnet 31 is identical to that of the permanent magnet 30, the plane of polarization may rotate anticlockwise by the amount of 45 degrees through the permanent magnet 31. In other words, by reversing the direction of magnetization of a permanent magnet, directions of propagation of the laser light beams at the second birefringent crystal plate 25 can be altered from the straightforward propagation to the oblique propagation and the oblique propagation to straightforward propagation, respectively. However, in either of the above cases, the separated two laser light beams will be merged into one beam by the act of the second birefringent crystal plate 25, thus causing no problems.

On the other hand, the reflected laser light "b" in reverse direction is split into two laser light beams once again at the second birefringent crystal plate 25 when passing therethrough, and the two laser light beams reenter into the second magneto-optical element 29. The polarization plane of the reflected laser light beams incident to the second magneto-optical element 29 are rotated clockwise by the amount of 45 degrees, so that each of the laser light beams becomes orthogonal to the polarization plane of the laser light beams, the split laser light beams of the laser light "a" in forward direction. In this way, the two laser light beams in reverse direction which have passed through the second magneto-optical element 29 are unable to pass through the polarizers 26 and 27 as being cut off.

In the above description, the Faraday rotation angle of each magneto-optical element has been set and adjusted to 45 degrees. However, practically, it is impossible to set and adjust the Faraday rotation angle of the magneto-optical element to exactly 45 degrees. The Faraday rotation angle of the magneto-optical element actually in use has a tolerance of ±1 degree about the 45 degrees on the ground of manufacturing problems, or it has a quality error of such amount.

Accordingly, in case of the reflected laser light "b", since the polarization planes of the laser light beams transmitted through the magneto-optical element 29 are not completely in coincidence with polarized light interceptive directions of the polarizers 26 and 27, a part of the reflected light "b" may pass through the polarizers 26 and 27, whereas planes of polarization of the transmitted laser light are identical to polarized light transmissive directions of the polarizers 26 and 27. The laser light beams of the reflected laser light "b" passed through the polarizers 26 and 27 enter the first magneto-optical element 28 and the polarization planes of which are rotated counter clockwise by 45 degrees, thus resultant polarization planes are orthogonal to the polarization planes of the laser light beams of the laser light "a" in forward direction at the right side of the first birefringent crystal plate 24.

In this way, the reflected laser light "b" in reverse direction may output from points where are different from the point of entrance of the laser light "a" in forward direction at the left side of the first birefringent crystal plate 24.

In accordance with this invention, since the reflected laser light is almost completely cut-off or bent its optical path by the polarizer 26, polarizer 27 and the first birefringent crystal plate 24, even if there is a quality error at the magneto-optical element or, more specifically, even if the Faraday rotation angle shifts by an amount of several degrees from the reference value of 45 degrees, it is possible to attain a high isolation ratio. In another word, if it is assumed, for example, that the optical path of the first birefringent crystal plate 24 makes an angle of 45 degrees against each polarized light cut-off direction of the polarizers 26 and 27 and a deviation from the Faraday rotation angle of 45 degrees of the first magneto-optical element 28, or the quality error $\Delta\theta$, is 5 degrees, an amount of light that passes through the polarizers 26 and 27 will be −20 dB. In addition to this, an amount of laser light which is not separated from a displacement of the polarization plane at the first birefringent crystal plate 24, or the laser light to be returned along the same optical path of the laser light "a", is also −20 dB, thus the theoretical isolation will be more than −40 dB.

In accordance with the optical isolator of this invention, an optical alignment along a direction of the optical axis of the birefringent crystal plate is substantially of no need. However, in order to attain a higher isolation ratio, the optical alignment along the direction of the optical path may be implemented for the polarizers 26 and 27. In the case of implementing the optical alignment, it is only required for the polarizers 26 and 27 to adjust, so that the reflected laser light in reverse direction will be cut-off completely by the polarizers 26 and 27.

In the optical isolator of the present invention, an amount of the reflected laser light in reverse direction that passes through the polarizers 26 and 27 can easily and directly measured by utilizing a photo detector, which is available on the market, to perform the aligning manipulation or operation along the optical path of the polarizers without any intuition nor experience which has been required in the prior art optical isolators.

EMBODIMENT 1

Preferred embodiments of this invention will be described in more detail by referring to FIG. 11.

Figure 11:
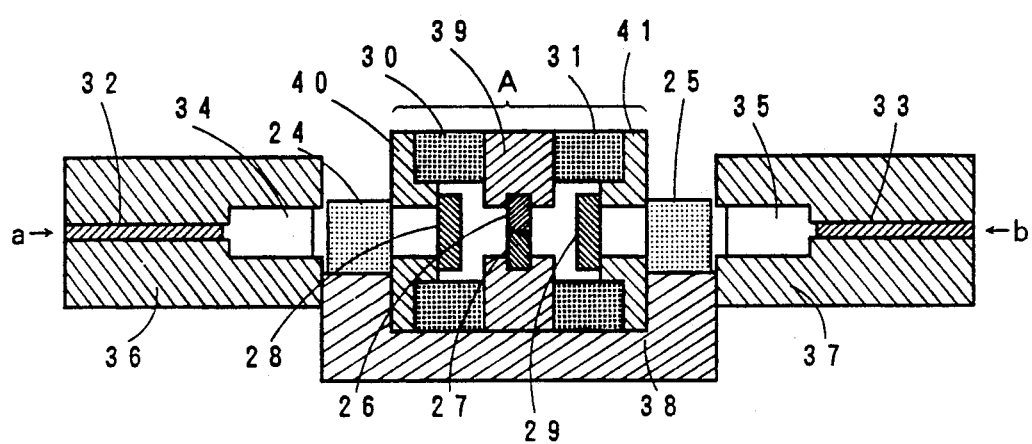
FIG. 11 is a cross sectional view of a polarization independent optical isolator embodying the present invention.

In FIG. 11, there is shown a polarization independent optical isolator fabricated in accordance with the following steps as described hereinafter.

A single mode optical fiber 32 having a core diameter of 10 μm and a graded-index lens 34 were placed in respective positions of a cylindrical metal jig 36 by aligning both center axes in line with each other and fixed with use of an adhesive. In like way, a single mode optical fiber 33 and a graded-index lens 35 were placed in respective positions of another cylindrical metal jig 37 by aligning both center axes in line with each other and fixed with use of the adhesive. A coupling loss of the optical fibers was 0.6 dB. A distance between end surfaces of the graded-index lenses 34 and 35 was 8.4 mm when the both jigs were mounted to the prescribed portions of a metal jig 38 having a length of 8 mm.

The metal jig 38 is provided with seats for installing and setting the birefringent crystal plates 24 and 25, magneto-optical elements 28 and 29, combined polarizers 26 and 27 and permanent magnets 30 and 31. The birefringent crystal plates 24 and 25 made up of rutile single crystal, a separation distance of which is 300 μm against a light having a wave length of 1.55 μm, were installed at the prescribed seats of the metal jig 38 in accordance with a conventional method. The two pieces of dichroic polarizers 26 and 27, such as of "Polarcor" which is a name used in trade by the Corning company, were mounted and fixed on a prescribed portion of a metal jig 39 in parallel by directing their polarized wave cut-off directions vertically. The magneto-optical element 28 such as of $Ho_{1.1}Tb_{0.6}Bi_{1.3}Fe_5O_{12}$ [HoTbBiIG] single crystal having a Faraday rotation angle of 44.1 degrees (at a wave length of 1.55 μm) was fixed to a prescribed portion of a metal jig 40, inserted into the cylindrical rare earth permanent magnet 30 and fixed therein. In a similar way, the magneto-optical element 29 such as of $Ho_{1.1}Tb_{0.6}Bi_{1.3}Fe_5O_{12}$ [HoTbBiIG] single crystal having a Faraday rotation angle of 45.8 degrees (at the wave length of 1.55 μm) was fixed to a prescribed portion of a metal jig 41, inserted into the cylindrical rare earth permanent magnet 31 and fixed therein. In the above embodiment, all the optical elements have been provided, in the usual way, with a non-reflective coating having the wave length of 1.55 μm at the center.

In next, the partially assembled polarizers 26 and 27 were assembled into one optical block, which is shown by the character "A" in FIG. 11, as being held between the magneto-optical elements 28 and 29.

The assembled optical block was then inserted into a prescribed portion of the metal jig 38 and the optical fiber 32 was coupled to the semiconductor laser light source and that the optical fiber 33 to an optical power meter. The optical isolator of this preferred embodiment was assembled by providing a precise adjustment of positioning the metal jig 37 within a vertical plane, which is perpendicular to an optical path, in such a manner as to make strongest the intensity of an incident light to the optical power meter by irradiating with a laser light having a wave length of 1.55 μm emitted from the semiconductor laser light source.

A light loss to be experienced in forward direction (the direction of the laser light "a") of the polarization independent optical isolator of this embodiment was 1.0 dB, wile a light loss in reverse direction (the direction of the laser light "b") thereof, or an optical isolation, was 52 dB.

When the measuring wave length has changed from 1500 nm to 1600 nm by maintaining a measuring temperature at 25° C.; an optical isolation of more than 38 dB has been obtained. Further, when an environmental temperature has varied from −20° C. to 80° C. as fixing the measurement wavelength to 1550 nm, the optical isolation was also more than 38 dB.

EMBODIMENT 2

The magneto-optical elements 28 and 29 of the second embodiment have employed bismuth substituted iron garnet single crystals having Faraday rotation angles of 42.5 degrees and 42.0 degrees in place of the bismuth substituted iron garnet single crystals of the first embodiment having the Faraday rotation angles of 44.1 degrees and 45.8 degrees at the wave length of 1.55 μm. The rest of the composing elements for assembling and producing a polarization independent optical isolator of the second embodiment were the same as that of the first embodiment. A characteristic of the polarization independent optical isolator of this second embodiment was measured in the same way as that of the first embodiment, wherein an optical isolation was 42 dB and that a coupling optical loss between the optical fibers was 1.1 dB.

COMPARATIVE EXAMPLE

Figure 5:
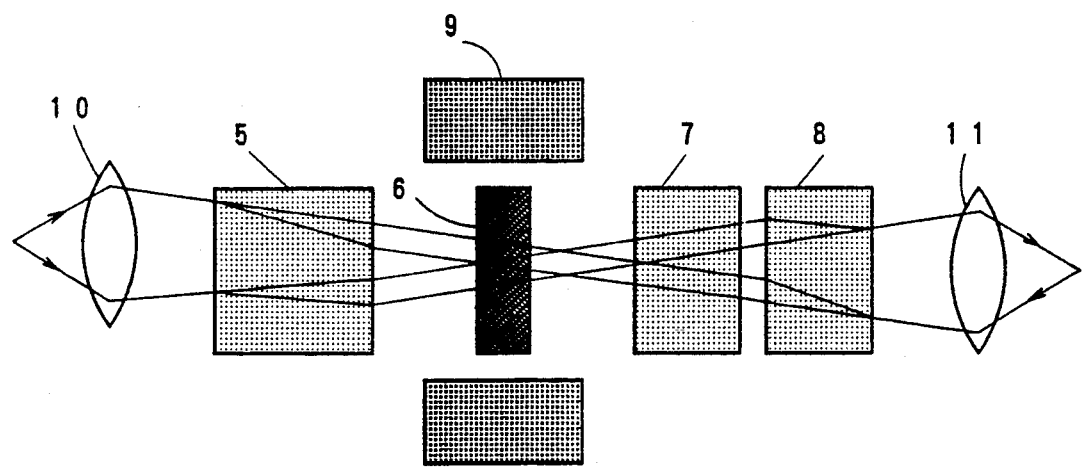
FIG. 5 is a diagram showing another prior-art polarization independent optical isolator with optical paths.
Figure 7:
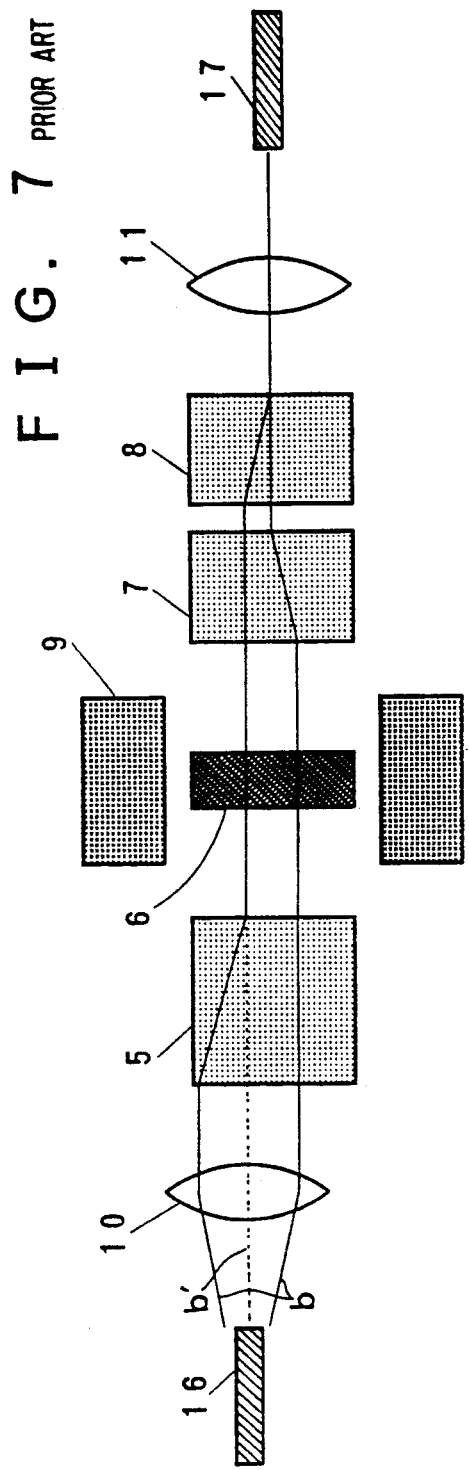
FIG. 7 is a diagram showing a method of assembling the polarization independent optical isolator of FIG. 5.
Figure 8:
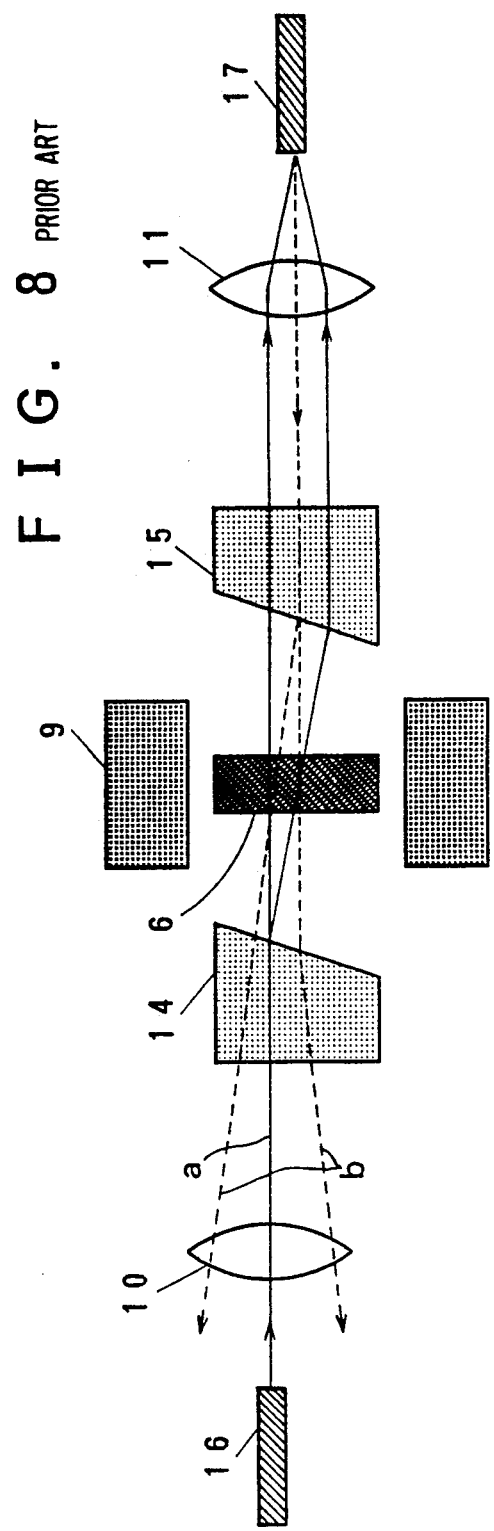
FIG. 8 is a diagram showing configuration and light paths of another prior-art polarization independent optical isolator.
Figure 6:
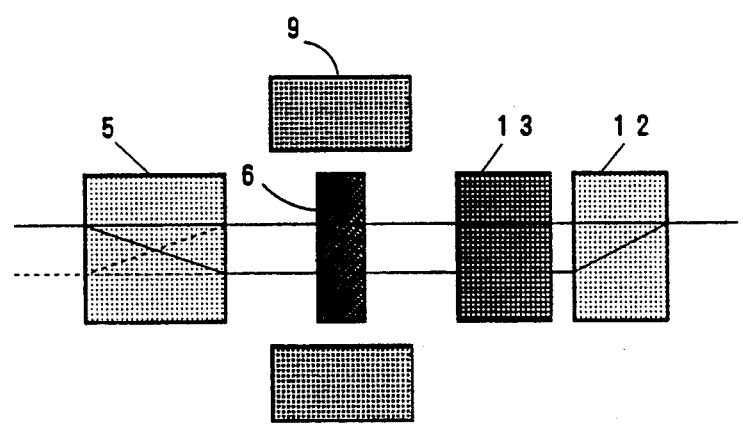
FIG. 6 is a diagram showing still another prior-art polarization independent optical isolator with optical paths.
Figure 9:
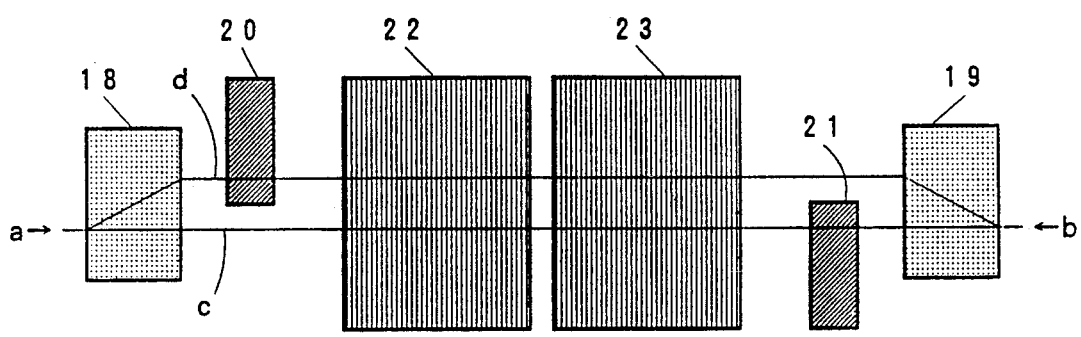
FIG. 9 is a diagram showing yet another prior-art polarization independent optical isolator with optical paths.

For comparing a performance, the polarization independent optical isolator shown in FIG. 5 was manufactured in accordance with the prior art method (Japanese Patent Publication No. 58-28561) shown in FIG. 7 by utilizing the magneto-optical element made up of the $Ho_{1.1}Tb_{0.6}Bi_{1.3}Fe_5O_{12}$ [HoTbBiIG] single crystal having the Faraday angle of 45.7 degrees. A characteristic of this polarization independent optical isolator was measured in the same way as in the first embodiment, wherein the optical isolation was 41 dB and insertion loss was 0.9 dB. Further, the optical isolation was measured by fixing the measuring light wavelength to 1550 nm while varying the environmental temperature, wherein the optical isolation was 30 dB or less within a range at or below 0° C. or at or above, 60°.

As it has been described above, in accordance with this invention, there is provided a polarization independent optical isolator, in an industrial scale and low production cost, having characteristics required of the optical isolator for use in the semiconductor laser communication or in the optical fiber communication system and, more specifically, having the optical isolation of 30 dB or above, without performing high precision adjustments of the polarizers and birefringent crystal plates which adjustments have been indispensable and extremely difficult in the production of the prior art polarization independent optical isolator.

It is to be understood by those skilled in the art that the foregoing description relates only to preferred embodiments of the present invention and that various changes and modifications may be made in the invention without departing from the spirit and scope thereof.

What is claimed is:

1. An optical isolator comprising:
    two separated birefringent crystal plates which spatially separate and then recombine two optical paths of laser light beams having polarization planes which are orthogonal to each other;
    two permanent magnets;
    two magneto-optical elements having a rotation angle of 45 degrees, and each being located in a respective one of said two permanent magnets; and
    two polarizers having different polarized wave cut-off directions substantially 90 degrees apart with one of said polarizers located in each of the separated optical paths produced by said two birefringent crystal plates, said two polarizers being interposed between said two magneto-optical elements, whereby said two magneto-optical elements and said two polarizers are arranged between said two birefringent crystal plates.

2. The optical isolator as claimed in claim 1, wherein said two birefringent crystal plates comprise rutile single crystal, and said two magneto-optical elements comprise bismuth substituted iron garnet signal crystal having Faraday rotation angles of 44.1 degrees and 45.8 degrees.

3. The optical isolator as claimed in claim 1, wherein said two birefringent crystal plates comprise rutile single crystal, and said two magneto-optical elements comprise bismuth substituted iron garnet single crystal having Faraday rotation angles of 42.5 degrees and 42.0 degrees.

4. In combination, an optical isolator, and a semiconductor laser;

said optical isolator comprising:

two separated birefringent crystal plates which spatially separate and then recombine two optical paths of laser light beams having polarization planes which are orthogonal to each other;

two permanent magnets;

two magneto-optical elements having a rotation angle of 45 degrees, and each being located in a respective one of said two permanent magnets; and two polarizers having different polarized wave cut-off directions substantially 90 degrees apart with one of said polarizers located in each of the separated optical paths produced by said two birefringent crystal plates, said two polarizers being interposed between said two magneto-optical elements, whereby said two magneto-optical elements and said two polarizers are arranged between said two birefringent crystal plates, and whereby coherent light generated by said laser and transmitted through said optical isolator in a first direction is prevented from being reflected back in an opposite direction into said laser.

* * * * *